No. 622,036. Patented Mar. 28, 1899.
J. H. & D. W. BROWN.
DEVICE FOR ASSISTING VEHICLES OFF CAR TRACKS.
(Application filed Feb. 14, 1898.)
(No Model.)
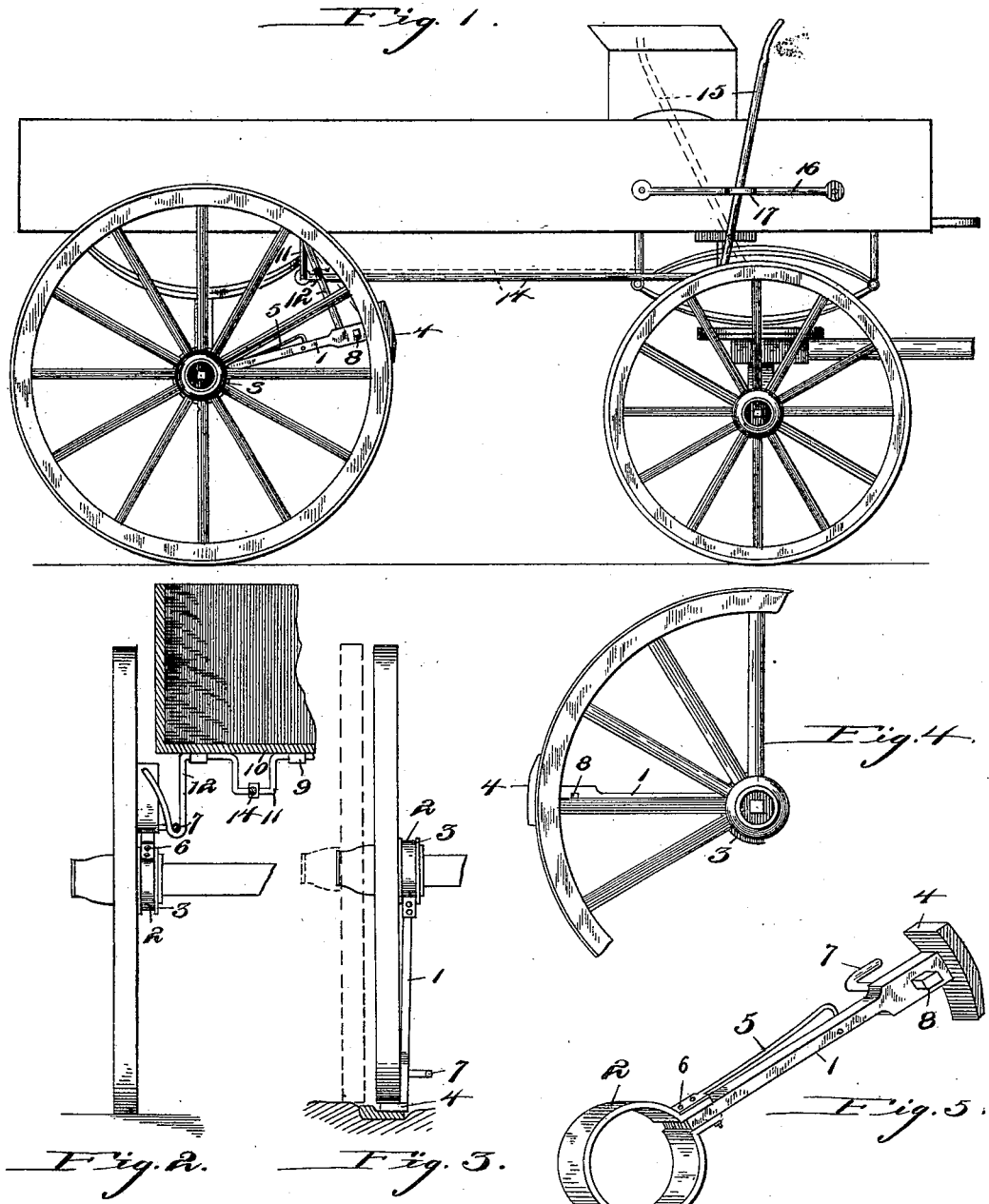
WITNESSES:
INVENTORS
J. H. Brown.
D. W. Brown.
BY
H. C. Evert
ATTORNEYS.

UNITED STATES PATENT OFFICE.

JAMES H. BROWN AND DAVID W. BROWN, OF SHANER, PENNSYLVANIA.

DEVICE FOR ASSISTING VEHICLES OFF CAR-TRACKS.

SPECIFICATION forming part of Letters Patent No. 622,036, dated March 28, 1899.

Application filed February 14, 1898. Serial No. 670,235. (No model.)

*To all whom it may concern:*

Be it known that we, JAMES H. BROWN and DAVID W. BROWN, citizens of the United States of America, residing at Shaner, in the county of Westmoreland and State of Pennsylvania, have invented certain new and useful Improvements in Devices for Assisting the Rear Wheel of a Vehicle Off Car-Tracks, of which the following is a specification, reference being had therein to the accompanying drawings.

This invention relates to certain new and useful improvements in a device for assisting the rear wheel of a wagon in turning out of car-tracks and the like; and it aims to provide a simple device by means of which the rear wheel may be elevated to a height equal to or above the height of the rail-tread.

The principal feature of the invention comprises a spring-actuated bar which is carried by a band that is loosely mounted upon the hub of the wheel. This bar carries at its free end a hammer-shaped claw or head which is adapted to engage the wheel-tire when the bar is released and falls into engagement with the rail, where it is engaged by and elevates the wheel, so as to permit the same to pass readily out of engagement with the rail. Means are provided for holding this bar normally out of its operating position and for a quick releasing of the same, so that it will fall into the operating position when desired. All of this construction will be hereinafter more specifically described, and particularly pointed out in the claims.

In describing the invention in detail reference is had to the accompanying drawings, forming a part of this specification, and wherein like figures of reference indicate similar parts throughout the several views, in which—

Figure 1 is a side view of a wagon, showing our improved device applied thereto. Fig. 2 is a rear view of the one wheel, showing the device in position, also showing a portion of the wagon-bed in vertical section. Fig. 3 is a front view of the wheel, showing the device in position for elevating the wheel. Fig. 4 is a side view of a portion of the wheel with the device secured in position, and Fig. 5 is a perspective view of the device.

Referring to the drawings by reference-figures, 1 denotes the spring-operated bar, the upper end of which is rigidly secured to the ends of the spring-band 2, which is loosely mounted on the collar 3, provided therefor on the inner half of the hub of the rear wheel. This bar 1 carries on its outer end a hammer-shaped head or claw 4, which is eccentrically mounted on this bar, so that when the device is released the head will engage outwardly over the outer periphery of the wagon-tire. In order to draw this bar 1 toward the wagon-wheel when the same is released and force the claw 4 outwardly over the tire, we attach a spring 5 to the said bar at a point below its center and connect the upper end of the spring by means of rivets or bolts 6, one of said rivets or bolts 6 passing through the arm and pivotally securing the same to the spring-band 2. On its inner face and near the lower end thereof this bar 1 carries an L-shaped arm 7, and on its outer face, at a point near the hammer-shaped head or claw 4, it is provided with a lug 8, the former of which engages supporting means, which holds the device normally in the inoperative position, and the latter of which is adapted to engage the nearest spoke when the device is released, so as to hold it in position and prevent the slipping of the wheel.

For supporting the device and retaining the same normally in the inoperative position we journal in keepers 9, secured to the underneath side of the bed 10, a rock-shaft 11, which is provided with a downwardly-extending hook-arm 12, which is engaged by the L-shaped arm 7 and holds the device in the inoperative position. For releasing the L-shaped arm from the hook-arm 12 we attach a rod 14 to the rock-shaft 11 and connect the forward end of this rod 14 to the lower end of the operating-lever 15, which passes upward at the side of the bed and operates within the rack 16, provided therefor. This rack 16 is provided at its center with a concave-convex portion 17, within which the lever 15 rests when the device is in the inoperative position and from which it must be forced to operate the rod 14 and move the rock-shaft, so as to release the hook-arm 12 from engagement with the arm 7. We will now assume that this operating-arm 15 is forced out of its rest 17 and moved backwardly to the position shown in dotted lines. This operation pulls the rod 14 forward, and consequently moves the rock-shaft and hook-arm 12 in the same direction, and thereby releasing the hook-arm 12 from engagement with the arm 7. The support for the device having been thus removed, the spring 5 forces the bar 1 toward the wheel and the device either falls by its own gravity until the hammer-shaped head or claw 4 comes into engagement with the rail or it is carried around by the turning of the wheel, and as the wheel rides upward on the said head or claw it is elevated to a point equal to or above the tread of the rail, and the wagon or other vehicle may then be readily turned from the tracks. It will be observed that upon the operating of the lever 15, so as to cause the aforesaid operation, the lever 15 should be again returned to its seat 17, so as to return the hook-arm 12 into position to be again engaged by the arm 7 as the device is carried around by the wheel, and this arm coming into such engagement withdraws the bar from the wheel and again retains the same in the inoperative position, while permitting the free and uninterrupted movement of the wheel.

While the foregoing appears to embody the preferable form of our invention, yet we do not wish to limit ourselves to the exact construction herein shown and described, as various changes may be made in the details of construction without departing from the general spirit of our invention.

Having fully described our invention, what we claim as new, and desire to secure by Letters Patent, is—

1. In a device of the character described, a band rotatably mounted on the hub of the wheel, a spring-operated bar pivotally secured to said band, a head or claw eccentrically mounted on the outer end of the said bar, an L-shaped arm carried by said bar, a hook-arm supported from the wagon-bed and adapted to engage the said L-shaped arm whereby the device is held in the inoperative position substantially as herein set forth.

2. In combination with a vehicle, a band rotatably mounted on the hub, a spring-operated bar pivotally secured to said band, and means for holding the same in the inoperative position to permit an uninterrupted movement of the wheel substantially as shown and described.

3. In combination with a vehicle, a band rotatably mounted on the wheel-hub, a spring-operated bar pivotally secured to said band and means for supporting and for releasing the said bar, substantially as herein shown and described.

4. In combination with a vehicle, a band rotatably mounted on the wheel-hub, a spring-operated bar pivotally secured to the said band, an eccentrically-mounted head or claw secured to the outer end of the said bar, an L-shaped arm secured on one side of the said bar, a lug secured to the opposite side of the said bar, and means carried by the vehicle for supporting and releasing said bar, substantially as herein shown and described.

In testimony whereof we affix our signatures in the presence of two witnesses.

JAMES H. BROWN.
DAVID W. BROWN.

Witnesses:
JOHN NOLAND,
A. M. WILSON.